United States Patent [19]
Tsien

[11] Patent Number: 5,296,703
[45] Date of Patent: Mar. 22, 1994

[54] SCANNING CONFOCAL MICROSCOPE USING FLUORESCENCE DETECTION

[75] Inventor: Roger Y. Tsien, La Jolla, Calif.

[73] Assignee: The Regents of The University of California, Oakland, Calif.

[21] Appl. No.: 862,633

[22] Filed: Apr. 1, 1992

[51] Int. Cl.$^5$ .............................................. H01J 3/14
[52] U.S. Cl. ................................. 250/235; 359/368; 356/318
[58] Field of Search ............... 250/234, 235, 236, 216, 250/458.1, 459.1, 461.1, 461.2; 356/318; 359/368, 393, 389, 202, 221

[56] References Cited

U.S. PATENT DOCUMENTS

| | | | |
|---|---|---|---|
| 3,978,281 | 8/1976 | Burrer . | |
| 4,449,046 | 5/1984 | Zuckerman et al. . | |
| 4,806,753 | 2/1989 | Noguchi | 250/235 |
| 4,827,125 | 5/1989 | Goldstein | 250/234 |
| 4,844,617 | 7/1989 | Kelderman et al. . | |
| 4,861,882 | 8/1989 | Smid et al. . | |
| 4,893,008 | 1/1990 | Horikawa | 250/234 |
| 5,034,613 | 7/1991 | Denk et al. | 356/318 |
| 5,117,466 | 5/1992 | Buican et al. | 356/318 |
| 5,127,730 | 7/1992 | Brelje et al. | 356/318 |
| 5,132,526 | 7/1992 | Iwasaki | 250/234 |
| 5,192,980 | 3/1993 | Dixon et al. | 356/318 |

FOREIGN PATENT DOCUMENTS

| | | |
|---|---|---|
| 1165158 | 4/1984 | Canada . |
| 4017549 | 1/1991 | Fed. Rep. of Germany . |
| 4023650 | 1/1992 | Fed. Rep. of Germany . |
| 9202839 | 2/1992 | PCT Int'l Appl. . |
| 2184321 | 6/1987 | United Kingdom . |

OTHER PUBLICATIONS

Grant, D. E., "Optical-Mechanical Design of the IBM 6670 Laser Printhead," Proceedings of the Society of Photo-Optical Instrumentation Engineers, vol. 200, Aug. 27-28, 1979, pp. 195-199.
Bernays, D. J., "The Use of Ronchi Rulings for High Precision, Two-Dimensional Galvo Deflection Systems," Proceedings of SPIE-The International Society for Optical Engineering, vol. 498, Aug. 21-22, 1984, pp. 175-182.
"The Primary Pattern Generator Part I-Optical Design," Cowan, M. J. et al., The Bell System Technical Journal, Nov. 1970, pp. 2033-2041.
"Generation of Precision Pixel Clock in Laser Printers and Scanners," Toyen, Gerald, Laser Scanning Components & Techniques, vol. 84, (1976) pp. 138-145.
"Flying Spot TV Ophthalmoscope," Webb, R. H. et al., Applied Optics, vol. 19, No. 17, Sep. 1, 1980, pp. 2991-2997.
"The Use of Ronchi Rulings for High Precision, Two-Dimensional Galvo Deflection Systems," Bernays, D. J., Laser Scanning & Recording, vol. 498, (1984) pp. 175-182.
"Optics for Laser Rasters," Webb, Robert, Applied Optics, vol. 23, No. 20, Oct. 15, 1984.
"Linearizing Resonant Scanners," Tweed, David, Reprinted from Lasers & Applications, Aug. 1985, pp. 65-69.
"Micro 90," Royal Microscopical Society, vol. 25, part 4 Jul. 1990.

Primary Examiner—David C. Nelms
Assistant Examiner—K. Shami
Attorney, Agent, or Firm—Pretty, Schroeder, Brueggemann & Clark

[57] ABSTRACT

A scanning confocal microscopes scans a sample with an incident beam of ultraviolet radiation, in a raster scan pattern, causing the sample to fluoresce and emit visible radiation, a portion of which retraces a 5 portion of the path optical of incident beam, to a dichroic mirror that separates it from the incident beam for detection by a photomultiplier tube. A clock signal for clocking the output of the photomultiplier tube is provided by a reference beam system that directs a reference beam onto the same scanning mirror as is the incident beam, at a coincident location on that mirror, and from there through a Ronchi grating having a uniform series of alternating transparent and opaque regions. The resulting pulsed reference beam is detected by a second photomultiplier tube, to produce a clock signal that is an accurate representation of the instantaneous scan rate of the reference beam and, thereby, the scanning incident beam.

18 Claims, 4 Drawing Sheets

SCANNING CONFOCAL MICROSCOPE USING FLUORESCENCE DETECTION

This invention was made with Government support under Grant No. BBS-8714246, awarded by the National Science Foundation. The Government has certain rights in this invention.

BACKGROUND OF THE INVENTION

1. Field of the Invention

The present invention relates generally to scanning confocal microscopes and, more particularly, to laser-scanning confocal microscopes that scans a sample with ultraviolet light and detect the resulting fluorescence.

2. Description of Related Art

In the scientific fields of physiology, cytobiology, etc., it is important to investigate the behavior of the intracellular ions of calcium, sodium, magnesium, etc. This is because these ions are thought to be closely linked with intracellular physioactivation. As part of a method of research on the behavior of the intracellular ions, fluorophores commonly are injected into cells. Such fluorophores combine uniquely with the certain species of ions within the cells, and fluoresce when irradiated with excitation light of specified wavelength.

By way of example, fluorescent probes indo-1, fura-2, fluo-3 and rhod-2 are known fluorophores useful in the detection of the calcium ions. Any of these fluorescent probes can be used to detect the presence of calcium ions within the cells. For example, the probe indo-1 fluoresces at wavelengths of either 405 nanometers (nm) or 485 nm in accordance with the concentration of the calcium ions, in response to excitation by ultraviolet radiation having a wavelength of about 350 nm. The probe fura-2, on the other hand, fluoresces at a wavelength of about 500 nm, in response to excitation by ultraviolet radiation having a wavelength of about 340 nm or 380 nm.

When the fluorescent probe has combined with the calcium ions and is excited by the ultraviolet light, it fluoresces in an amount that varies in accordance with the calcium ion concentration. Therefore, the concentration 5 of the calcium ions in each local area of a sample can be determined by measuring the intensity of the fluorescent light. The excitation and fluorescence detection can be carried out across sample surface, whereby a two-dimensional video image can be obtained. Further, a plurality of video images can be obtained in time series, whereby the time behavior of the ions can be investigated in detail.

Where the ratio between the intensities of the two peaks of the fluorescence spectra is detected under the ultraviolet excitation of the fluorescence probe indo-1, or where the ratio between the intensities of the respective peaks of the fluorescence spectra is detected under the alternate excitation operations of the fluorescent probe fura-2 with the two wavelengths of ultraviolet radiation, an accurate measurement of calcium ion concentration can be reliably obtained.

It is desirable to the scan the doped sample with an incident laser beam in a raster pattern and to produce from the resulting fluorescent radiation a standard video-format signal so that fluorescence of the sample can be viewed on a video display. For a true two-dimensional representation of the sample, the successive scans must be linear. It is known to linearize such scans by generating a reference beam that scans at the same rate as the incident laser beam and by directing that reference beam through a Ronchi grating to produce a pulsed beam from which a clock signal can be derived representative of the scanning speed. Although such a technique is effective in roughly linearizing non-linear scan data, the reference beam and incident laser beam do not always scan at rates that precisely track each other.

It should therefore be appreciated there is a need for a scanning confocal microscope that scans a sample in a raster scan pattern in which the scan data is a true representation of the sample's two-dimensional proportions. The present invention fulfills this need.

SUMMARY OF THE INVENTION

The present invention is embodied in a scanning confocal microscope for scanning a sample with an incident beam of radiation and detecting the resulting fluorescence radiation to provide data suitable for use in a raster scan display of the fluorescence, the display being a substantially linear representation of the sample. More particularly, a collimated incident beam from a laser is directed by optical path means to impinge on the sample. The optical path means includes a primary dichroic mirror followed by first and second, closely-spaced scanning mirrors that are rotatable about mutually orthogonal axes. The incident beam thereby scans repeatedly across the sample, which thereupon fluoresces and emits radiation having first and second predetermined wavelengths, different from the wavelength of the incident beam. A portion of that emitted radiation forms a fluorescence beam that retraces the path of the incident beam back to the primary dichroic mirror, which separates the fluorescence beam from the incident beam. A fluorescence beam detector then detects the intensity of the fluorescence beam and generates a corresponding fluorescence scanned signal.

Reference beam means is included for providing a clock signal that can be used to linearize the fluorescence scan signal. In particular, the reference beam means includes a splitter disposed between the laser and the scanning mirrors, for redirecting a portion of the incident beam to produce a reference beam. This reference beam is caused to impinge on the first scanning mirror, at a location substantially coincident with the point of impingement of the incident beam. The resulting scanning reference beam is directed through a grating having alternating sequence of transparent and opaque regions to a reference beam detector, for generating a clock signal representative of the position of the scanning reference beam, and thereby the scanning incident beam.

The fluorescence beam detector includes a secondary dichroic mirror for separating the fluorescence beam into first and second beams that include radiation in the predetermined first and second wavelengths. A first detector then detects the intensity of the first beam, while a second detector detects the intensity of the second beam. The first and second detector signals are sampled in accordance with the clock signal generated by the reference beam detector, and means are provided for computing a real-time ratio of the successive samples In another feature of the invention, a lens is located between the grating and the reference beam detector, for directing the pulsed reference beam transmitted by the grating to substantially the same position on the detector, regardless of its point of impingement on the grating. This ensures that spatial sensitivity variations across the surface of the detector will not affect the clock signal being generated.

In yet another feature of the invention, a microscope objective is disposed between the scanning mirrors and the sample, and an aperture is disposed between the splitter and the primary dichroic mirror, for limiting the incident beam from entering a peripheral edge of the microscope objective. This ensures that the scanning incident beam forms a small spot size on the sample, enhancing resolution. The aperture preferably is disposed at a position that is conjugate with a pupil of the microscope objective, and the aperture preferably has an adjustable opening.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
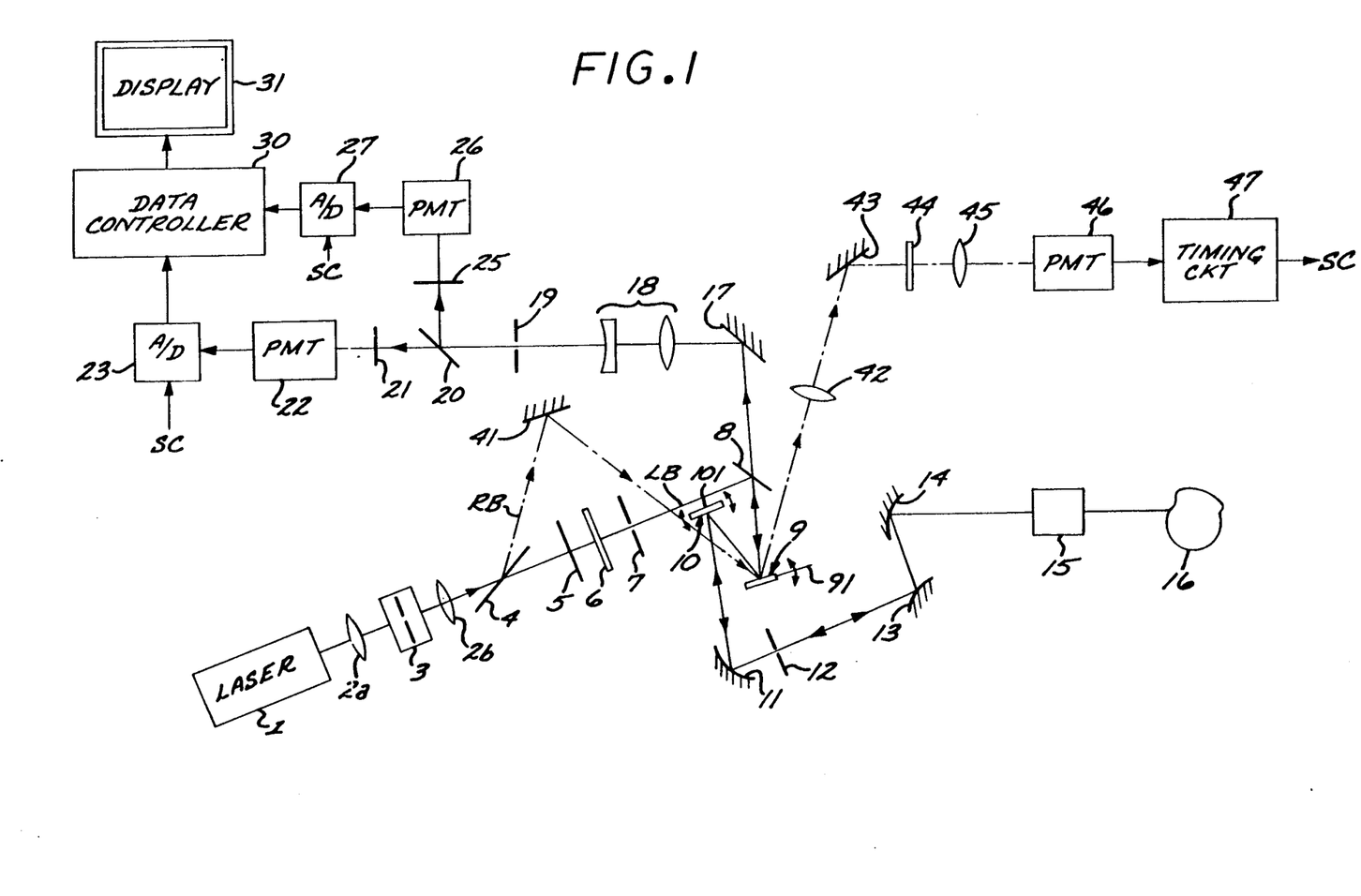
FIG. 1 is a schematic diagram of a scanning confocal microscope in accordance with the present invention.

With reference now to the drawings, and particularly to FIG. 1, there is shown a scanning confocal microscope adapted to scan a sample 14 and measure calcium ion concentration within the sample, where the sample is doped with a fluorescent probe such as indo-1. A laser light source 1 emits a collimated beam LB of ultraviolet radiation having a wavelength of 351 nanometers (nm), which is expanded by a beam expander that includes convex lenses 2a and 2b. The laser beam passes through a spatial filter, such as pinhole diaphragm 3, which is interposed between the convex lenses 2a and 2b, and thereafter passes through a beam splitter 4, a shutter 5, an optical attenuator 6, and an aperture 7, finally reaching a primary dichroic mirror 8. The laser beam LB is reflected by the dichroic mirror 8 and then scanned in two dimensions by a horizontal scanning mirror 9 and a vertical scanning mirror 10. The scanning beam is then introduced into a microscope objective 15 via a reflection-type relaying optical system, which is configured of concave mirrors 11 and 14 and a convex mirror 13. A view iris 12 disposed between the mirrors 11 and 13 limits the observation area of the sample.

The microscope objective 15 has a focusing performance with aberrations corrected for visible light, as is incorporated into an ordinary optical microscope. The laser beam LB from the relaying optical system is condensed onto the sample 16 by the objective 15, and the beam scans the sample 16 in two dimensions in response to the scanning by the two scanning mirrors 9 and 10.

When the fluorescence probe added in the sample 16 containing calcium ions is irradiated with the laser beam, it fluoresces with a wavelength characteristic according to the extent of the calcium ion concentration, Since, in the case of this embodiment, the fluorescence probe indo-1 is used as a fluorophore, the spectrum of the emanated fluorescence has a peak at wavelengths of either 405 nm or 485 nm.

A portion of the fluorescent emissions is directed outwardly and condensed by the microscope objective 15, after which it retraces the same path as that of the incident laser beam LB and passes through the primary dichroic mirror 8. Subsequently, the fluorescence beam FL is reflected by a reflector 17 and guided to a pinhole diaphragm 19 by a condensing lens system 18. After passing through the pinhole diaphragm, the fluorescence beam FL is separated by a secondary dichroic mirror 20 into a first wavelength component that includes the wavelength 405 nm and a second wavelength component that includes the wavelength 485 nm. One of the separated fluorescence components is passed through a filter 21 and detected by a photomultiplier tube (PMT) 22, while the other fluorescence component is passed through a filter 25 and detected by a PMT 26. The outputs of the respective PMTs 25 and 26 are digitized by analog-to-digital converter circuits (A/D) 23 and 27, in response to a sampling clock SC to be described below. The resulting digital data words are stored as video data in frame memories included in a data controller 30. The stored video data is selectively displayed on a CRT display unit 31.

The horizontal scanning mirror 9 is a high-speed type galvanometer scanner, which is vibrated at its resonant frequency about an axis of rotation 91 parallel with the sheet of the drawing. The mirror resonates in response to a sinusoidal input signal having a frequency of about 8 kHz. The mass of the scanning mirror 9 needs to be small, to permit resonance at such a high frequency. To this end, the reflective surface of the scanning mirror 9 is arranged at a position that is substantially optically conjugate with the pupil of the microscope objective 15. Thus, the diameter of the scanning mirror 9 can be reduced to the extent of filling up the pupil of the objective.

The vertical scanning mirror 10, on the other hand, is a low-speed type galvanometer scanner. In order to realize the standard interlaced scanning of the NTSC system, this mirror is vibrated about an axis of rotation 101 perpendicular to the sheet of the drawing and in response to a sawtooth waveform having a frequency of 60 Hz, which is equal to the field rate of a standard NTSC video signal. The reflective surface of the vertical scanning mirror 10 is positioned very close to that of the horizontal scanning mirror 9. This enable the size of the mirror 10 to be minimized. Letting Θ denote one half of the deflection angle of the horizontal scanning mirror 9 (i.e., the maximum inclination angle of the reflective surface relative to a predetermined reference plane) and further letting r denote the radius of the image of the pupil of the microscope objective 15 on the reflective surface of the vertical scanning mirror 10 and letting y denote the length of the vertical scanning mirror 10, the distance d between the two scanning mirrors preferably satisfies the following conditional expression:

$$2d \tan\Theta + 2r < y$$

Figure 2:
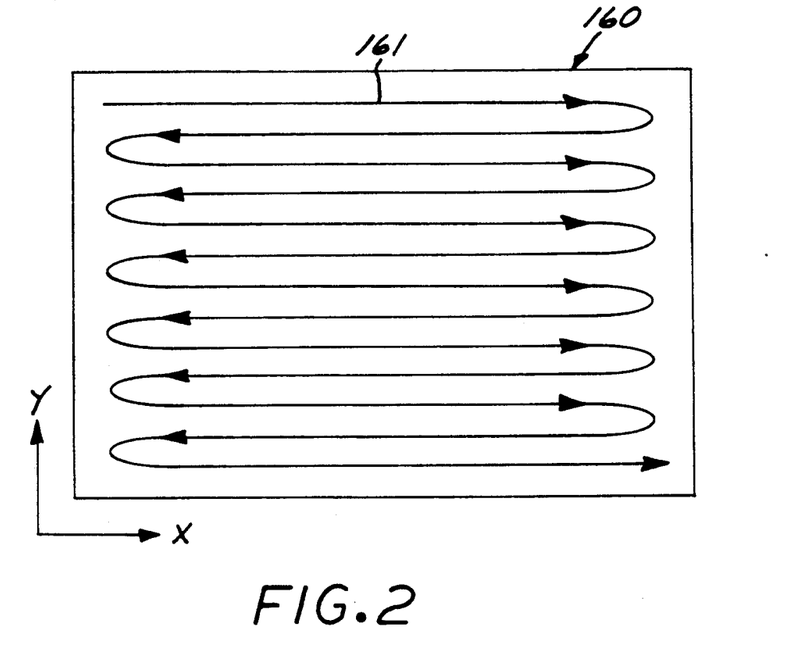
FIG. 2 is a view of the local scanning area of a sample being scanned by the confocal microscope of FIG. 1.

As shown in FIG. 2, the incident laser beam LB reflected by the horizontal and vertical scanning mirrors 9, 10 raster-scans the local scanning area 160 of the sample 16, along scanning lines 161. The depicted scanning pattern is formed by a combination of the shifts of scanning positions in a Y-direction effected by the vertical scanning mirror 10 and the reciprocative scanning in an X-direction effected by the horizontal scanning mirror 9. The local scanning area 160 can be scanned at a standard NTSC line frequency of 15.75 kHz on the basis of the reciprocative raster scanning in the illustrated scanning pattern. As a result, the video image of the sample can be formed at a video rate of 30 frames/sec.

A reference beam RB for monitoring the vibrations of the horizontal scanning mirror 9 is utilized in order to generate the sampling clock SC mentioned above. Referring back to FIG. 1, the reference beam RB is produced by the beam splitter 4, which reflects part of the laser beam LB to a mirror 41, which in turn reflects the beam toward the horizontal scanning mirror 9. The reference beam RB and the laser beam LB impinge on an identical point on the scanning mirror 9, whereby the two beams are deflected by equal amounts, regardless of any mechanical distortion of the mirror. To prevent the reference beam RB from interfering with the vertical scanning mirror 10, it impinges on the horizontal scanning mirror 9 at an incidence angle different from that of the laser beam LB. The reference beam RB reflected by the horizontal scanning mirror 9 is condensed by an fΘ lens 42 and reflected by a mirror 43 to form a beam spot on a Ronchi grating 44.

Figure 3:
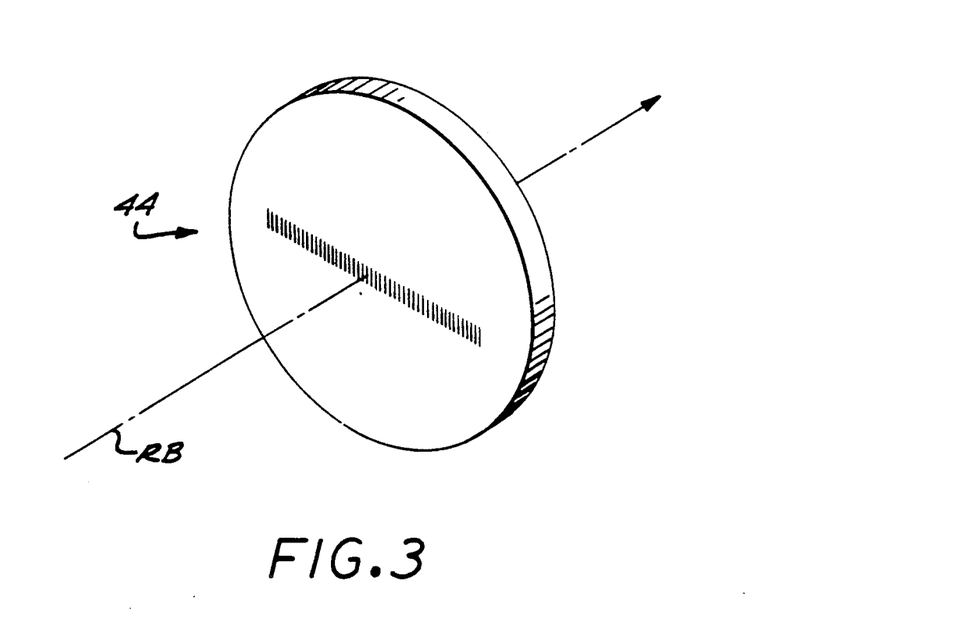
FIG. 3 is a perspective view of the Ronchi grating included in the confocal microscope of FIG. 1.

As shown in FIG. 3, the Ronchi grating 44 has alternating transparent and opaque regions on a transparent glass baseplate. The transparent and opaque regions are of equal width. Alternatively, the grating has light-transmitting recurrent regions provided at equal intervals on a glass baseplate covered with an opaque film. The spot of the reference beam RB reciprocatingly scans the surface of the Ronchi grating 44 along the direction of the alternating regions in response to the vibrations of the horizontal scanning mirror 9.

The reference beam RB transmitted through the Ronchi grating 44 is collected by a condensing lens 45 and then detected by a PMT 46. The condensing lens preferably is spaced from the Ronchi grating such that the beam always impinges on the same portion of the PMT 46, regardless of its position on the Ronchi grating. As a result, the reference beam RB is detected without being affected by any nonuniform spatial sensitivity of the PMT. The signal output by the PMT is provided to a timing circuit 47, to generate the sampling clock SC.

Figure 4:
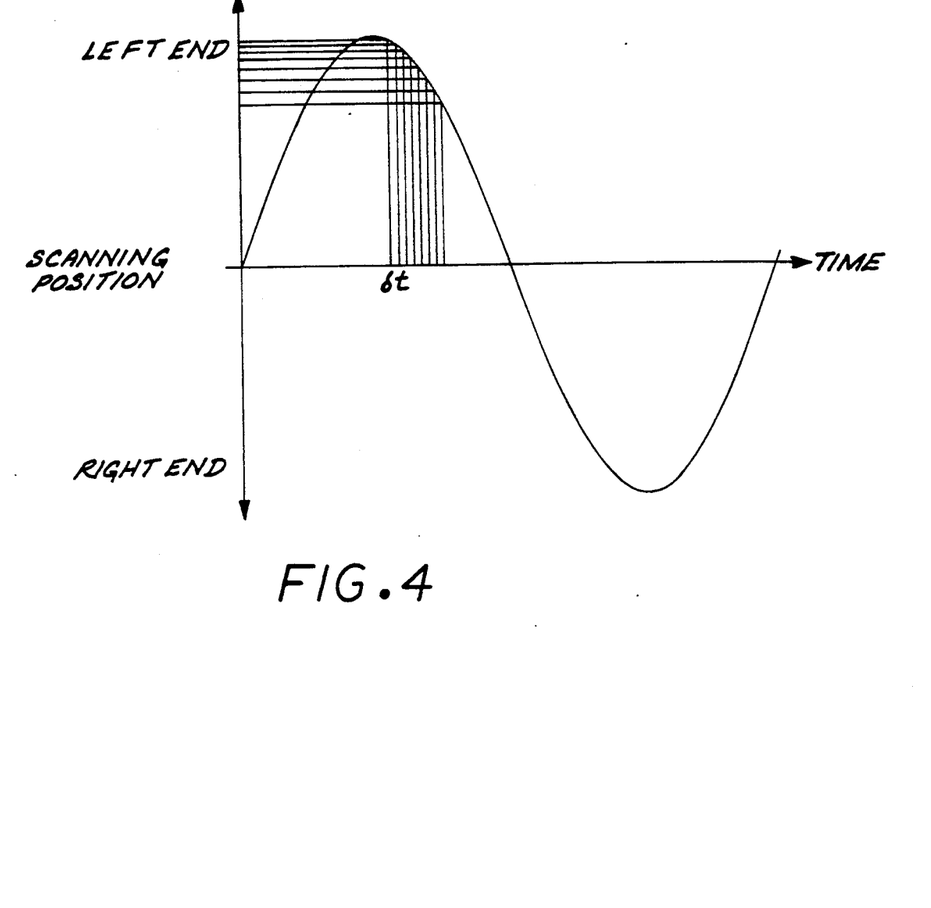
FIG. 4 is a graph of the relationship between a driving sinusoidal signal and the scanning position of the horizontal scanning mirror of the confocal microscope of FIG. 1.

The timing of the data sampling operations in the A/D converter circuits 23 and 27 now will be explained. As stated above, the horizontal scanning mirror 9 is driven in response to a sinusoidal input signal. From FIG. 4, which shows the relationship between the sinusoidal input signal and the position of the scanning mirror 9, it is seen that the positional variation of the mirror 9 in its widthwise direction per unit time δ is larger near the center of the vibrations and smaller near the two ends of the vibrations. Accordingly, the incident laser beam LB scanning the surface of the sample 16 has a scanning speed that is fastest near the middle of each scanning line 161 (see FIG. 2) and slowest near the two ends of each scanning line. Therefore, to obtain a distortionless video image, 5 it is necessary to execute the data sampling operations in the A/D converter circuits 23 and 27 at temporally unequal intervals conforming to such a scanning characteristic.

Figure 5:
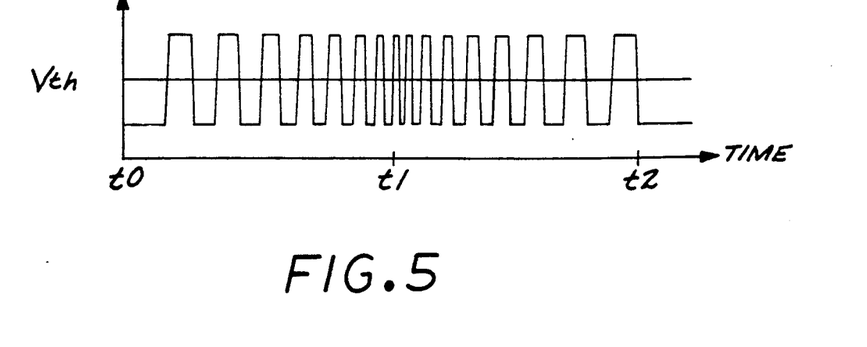
FIG. 5 depicts the waveform generated by a photomultiplier tube positioned to detect the reference beam after it has passed through the Ronchi grating.

As previously mentioned, the Ronchi grating 44 includes an alternating sequence of transparent and opaque regions, of equal and uniform widths. The spot of the reference beam RB has a diameter comparable to such widths. Consequently, the signal output by the PMT 46 is a clipped sine wave having a frequency that varies from a high value when the beam scans a midpoint of the grating to a low value when the beam scans either end of the grating. This PMT output signal is depicted in FIG. 5

The timing circuit 47 (FIG. 1) high-pass filters the output signal from the PMT 46, to remove dc and various low-frequency components, and compares the filtered signal with a threshold $V_{th}$. A clock signal SC including a short, fixed-length pulse for each detected crossing of the threshold $V_{th}$ is then generated, for use in clocking the two PMTs 22 and 26. Thus, two clock pulses are generated for each transparent region of the Ronchi grating, and clocking is more consistent for the two opposite scan directions.

It will be appreciated that each pulse in the clock signal SC represents movement of the scanning reference beam RB, and therefore the incident laser beam, by a fixed amount corresponding to the spacing of the opaque regions in the Ronchi grating 44. The sampling of the PMTs 22 and 26 thereby generates data representative of linear scans of the sample 16, despite the use of a scanning mirror 9 that scans in a non-linear, sinusoidal fashion.

Figure 6:
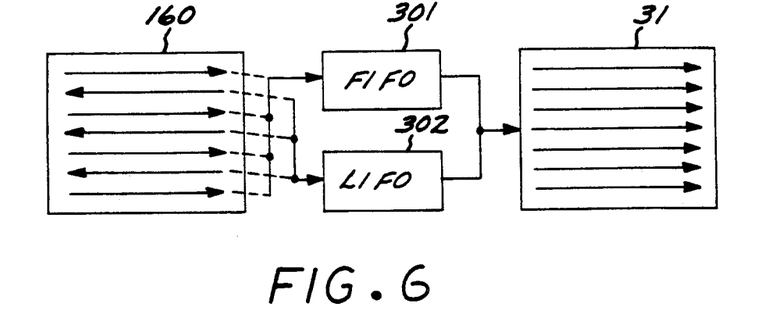
FIG. 6 is a schematic block diagram of the arrangement of line memories for accumulating video data.

As previously discussed, horizontal scanning of the laser beam LB reciprocates as shown in FIG. 2. The data controller 30 (FIG. 1) therefore includes two kinds of line memories for accepting video data from the two A/D converters 23, 27 and converting that data into a standard NTSC-format video signal. As shown in FIG. 6, a first line memory 301 is a first-in, first-out (FIFO) memory, into which is written the succession of video data words acquired by the scanning the odd-numbered scanning lines. A second line memory 302 is a last-in, first-out (LIFO) memory, into which is written the succession of video data words acquired by the scanning the even-numbered scanning lines. Words are read out of the FIFO memory in the same order in which they are written, whereas words are read out of the LIFO memory in a reverse order form which they are written. FIG. 6 schematically illustrates the operations of the two line memories 301, 302 in the directions of the scanning lines on the scanning area 160 of the sample 16 and the display unit 31. In actuality, frame memories preferably are provided on the input and output sides of the two line memories.

Figure 7A:
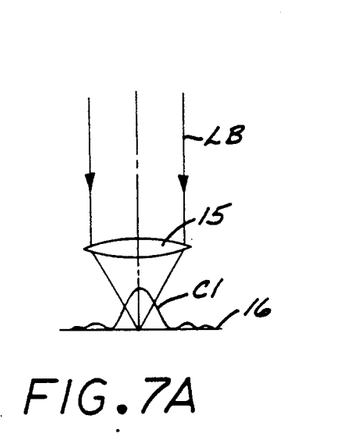
FIG. 7A shows the light intensity distribution characteristic within the surface of the sample, of the laser beam after passing through the microscope objective.
Figure 7B:
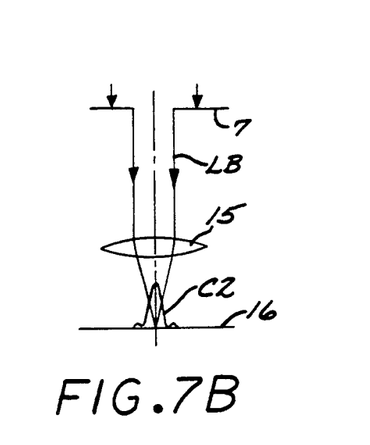
FIG. 7B shows the light intensity distribution characteristic within the surface of the sample, of the laser beam after passing through an aperture and the microscope objective.

As stated above, the microscope objective 15 of the optical microscope has a focusing performance with aberrations corrected for visible light, although the laser beam LB for scanning the sample 16 has an ultraviolet wavelength of about 350 nm. Depicted by a curve C1 in FIG. 7A is a light intensity distribution characteristic within the surface of the sample 16 in the case where the laser beam LB reflected by the reflecting optical system 11, 13, 14 is caused to enter the objective 15. Such a light intensity distribution characteristic cannot form a clear light spot and cannot attain a precise spot fluorometry, because the corrections of aberrations at the peripheral edge of the objective 15 are inferior To overcome this drawback, the aperture 7 (FIG. 1) is disposed between the laser and the scanning mirrors 9, 10. This aperture 7 is arranged to be imaged onto the pupil of the microscope objective 15, and it cuts the peripheral part of the laser beam LB so that the portion of the beam that would otherwise pass through the peripheral edge of the objective does not contribute to focusing. Thus, the focusing performance of the objective 15 in the ultraviolet region is greatly enhanced, as shown by a curve C2 in FIG. 7B. By way of example, in case of an objective of 40 diameters/NA (numerical aperture) = 1.3, the best focused spot is formed when the diameter of the beam is limited so as to establish an NA of about 0.8. However, because this value can differ depending upon the kind of objective used, the opening diameter of the aperture 7 preferably should be adjustable.

In this manner, the NA of the microscope objective 15 is diminished by cutting the peripheral part of the excitation light beam. Consequently, the original performance of the objective 15 cannot be demonstrated, and a light spot which is close to a diffraction limit at the NA inherent in the objective cannot be formed.

In the optical arrangement of FIG. 1, the aperture 7 is located anterior to the primary dichroic mirror 8, so as not to limit the fluorescence beam FL emanating from the sample 16 and guided to the PMTs 22 and 26, for detection. Therefore, the fluorescence at visible wavelengths is collected with the full NA of the microscope objective 15. This location also allows the shape of the three-dimensional focused spot irradiating the sample to be controlled by adjusting the aperture diameter. The confocal microscope has the feature that an optical sectioning function, for example, is attained by the pinhole diaphragm 19 which is arranged to be anterior to the PMTs 22, 26. At that same time, however, it is also true that the intensity of the fluorescence is 5 reduced considerably. Some samples fluoresce only in amounts that are insufficient for the fluorometry of good signal-to-noise ratio. In that case, it is necessary to increase the quantity of excitation light. Unfavorably, however, increased excitation light sometimes can saturate and bleach the fluorescence. Therefore, the detectible quantity of the fluorescence is increased in such a way that the shape of the three-dimensional focused beam on the sample is extended in the direction of the optical axis of the objective optical system by narrowing the excitation beam and making the NA smaller.

Figure 8A:
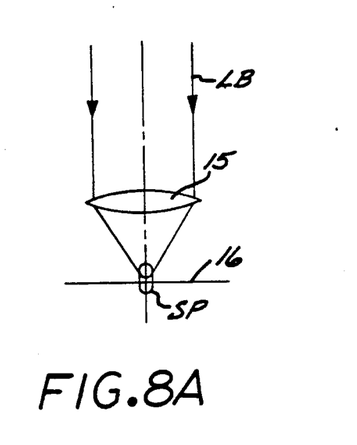
FIG. 8A shows the three-dimensional focused spot of the laser beam passed through the microscope objective
Figure 8B:
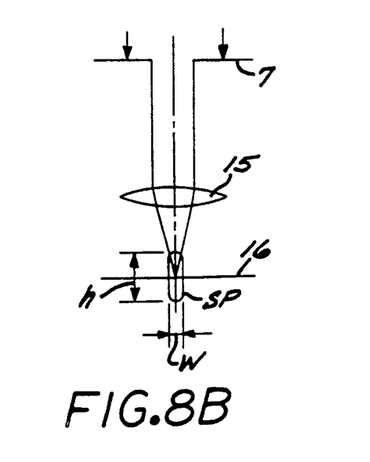
FIG. 8B shows the three-dimensional focused spot of the laser beam passed through the aperture and the microscope objective.

FIG. 8A shows the three-dimensional focused spot SP of the laser beam LB in the absence of the aperture 7, while FIG. 8B shows the three-dimensional focused spot narrowed by the aperture 7. The width w of the focused spot SP in the planar direction of the sample 16 proportional to the NA of the microscope objective 15, while the height h of the focused spot in the optical-axis direction of the optical system is proportional to the square of the NA. Resolution of the microscope within the surface of the sample 16 therefore is not appreciably reduced. In this case, the effect of sectioning diminishes, but the balance between the light quantity and the sectioning effect can be selected by the operator.

Although the invention has been described in detail with reference only to the presently preferred embodiment, those skilled in the art will appreciate that various modifications can be made without departing from the invention. Accordingly, the invention is defined only by the following claims.

I claim:

1. A confocal microscope for scanning a sample, comprising:
   a laser for generating a collimated incident beam having a predetermined wavelength;
   optical path means including
      a primary dichroic mirror, and
      a first scanning mirror, disposed between the dichroic mirror and the sample and rotatable about a first axis, for scanning the incident beam repeatedly across the sample, whereupon the sample fluoresces and emits radiation having a first predetermined wavelength, different from the wavelength of the incident beam, a portion of the emitted radiation forming a fluorescence beam that retraces the path of the incident beam back to the primary dichroic mirror,
      wherein the primary dichroic mirror separates the fluorescence beam from the incident beam;
   a fluorescence beam detector for detecting the intensity of the fluorescence beam and for generating a corresponding fluorescence scan signal; and
   reference beam means including
      means for directing a reference beam toward the first scanning mirror, where it impinges on the first scanning mirror at a location coincident with the incident beam, to produce a scanning reference beam,
      a grating having a series of alternating transparent and opaque regions and positioned to receive the scanning reference beam and produce a pulsed reference beam indicative of the scan rate, and
      a reference beam detector for detecting the intensity of the pulsed reference beam and for generating a corresponding clock signal representative of the scan rate of the scanning reference beam and thereby the incident beam;
   wherein the clock signal generated by the reference beam detector can be used to sample the fluorescence scan signal generated by the fluorescence beam detector.

2. A confocal microscope as defined in claim 1, wherein:
   the sample further fluoresces and emits radiation having a second predetermined wavelength, different from the first wavelength, a portion of the further emitted radiation being part of the fluorescence beam that retraces the path of the incident beam back to the primary dichroic mirror; and
   the fluorescence beam detector includes
      a secondary dichroic mirror for separating the fluorescence beam into a first beam that includes radiation having the first predetermined wavelength and a second beam that includes radiation having the second predetermined wavelength,
      a first detector for detecting the intensity of the first beam and for generating a first signal, and a second detector for detecting the intensity of the second beam and for generating a second signal, the first and second signals together constituting the fluorescence scan signal.

3. A confocal microscope as defined in claim 2, wherein the fluorescence beam detector further includes:

means for sampling the first and second signals in accordance with the clock signal generated by the reference beam detector; and means for computing a real-time ratio of the successive samples of the first and second signals.

4. A confocal microscope as defined in claim 1, wherein the optical path means further includes a second scanning mirror disposed immediately adjacent to the first scanning mirror, with no intervening optical elements, and rotatable about a second axis, substantially orthogonal to the first axis, about which the first scanning mirror is rotatable, such that the incident beam is caused to scan the sample in a raster scan pattern.

5. A confocal microscope as defined in claim 1, wherein the reference beam means further includes a lens located between the grating and the reference beam detector, for directing the pulsed reference beam to substantially the same position on the detector regardless of its point of impingement on the grating.

6. A confocal microscope as defined in claim 1, wherein:

the reference beam means further includes a beamsplitter disposed between the laser and the primary dichroic mirror, for redirecting a portion of the incident beam to produce the reference beam; and the optical path means further includes a shutter, disposed between the beamsplitter and the primary dichroic mirror, for selectively blocking the incident beam from scanning the sample, the reference beam means nevertheless continuing to generate the clock signal.

7. A confocal microscope as defined in claim 1, wherein the optical path means further includes:

a microscope objective disposed between the first scanning mirror and the sample; and an aperture, disposed between the laser and the primary dichroic mirror, for limiting the incident beam from entering a peripheral edge of the microscope objective.

8. A confocal microscope as defined in claim 7, wherein the aperture is disposed at a position such that it is imaged onto the microscope objective.

9. A confocal microscope as defined in claim 7, wherein the aperture has an adjustable opening.

10. A confocal microscope for scanning a sample, comprising:

a microscope objective;

a laser for supplying a collimated incident beam having a first wavelength that is directed through said microscope objective to a sample to be scanned;

beam deflection means for periodically deflecting said incident beam so that said beam scans the sample, whereupon the sample radiates light having a second wavelength, a portion of the radiated light passing back through said microscope objective and said beam deflection means;

a dichroic mirror, disposed between said laser and said beam deflection means, for separating the portion of the light radiated by the sample from said incident beam;

a detector for receiving the portion of the light radiated by the sample and passed back through said microscope objective and said beam deflection means, and for generating a signal representing the intensity of that radiated light; and aperture means, disposed between said laser and said dichroic mirror, at a position where said incident beam is collimated, for limiting said incident beam from entering a peripheral edge of said microscope objective.

11. A confocal microscope as defined in claim 10, wherein said aperture means is disposed at a position such that it is imaged onto said microscope objective.

12. A confocal microscope as defined in claim 10, wherein said aperture means has an adjustable opening.

13. A confocal microscope for scanning a sample, comprising:

a microscope objective;

means for positioning said microscope objective adjacent to the sample to be scanned;

a laser for supplying a collimated incident beam having a predetermined wavelength that is directed through said microscope objective to a sample to be scanned;

beam deflection means for periodically deflecting said incident beam so that said beam scans the sample, whereupon the sample fluoresces and radiates light having first and second predetermined wavelengths, a portion of the radiated light forming a fluorescence beam that passes back through said microscope objective;

aperture means positioned to limit said incident beam from entering a peripheral edge of said microscope objective, but not to receive any portion of the fluorescence beam;

a fluorescence beam detector including a dichroic mirror for separating the fluorescence beam into a first beam that includes radiation having the first predetermined wavelength and a second beam that includes radiation having the second predetermined wavelength, a first detector for detecting the intensity of the first beam and for generating a first signal, a second detector for detecting the intensity of the second beam and for generating a second signal, means for sampling the first and second signals in accordance with a clock signal, frame memory means for storing the successive samples of the first and second signals, and means for computing a real-time ratio of the successive samples of the first and second signals;

a video display; and means for selecting data from said frame memory means for display on said video display.

14. A confocal microscope as defined in claim 13, wherein:

said confocal microscope further includes a primary dichroic mirror for separating the fluorescence beam from the incident beam; and said beam deflection means includes a first scanning mirror, disposed between the dichroic mirror and the sample and rotatable about a first axis, for scanning the incident beam repeatedly across the sample, and a second scanning mirror disposed immediately adjacent to the first scanning mirror, with no intervening optical elements, and rotatable about a second axis, substantially orthogonal to the first axis, about which the first scanning mirror is rotatable, such that the incident beam is caused to scan the sample in a raster scan pattern.

15. A confocal microscope as defined in claim 14, and further including:

means for directing a reference beam toward the first scanning mirror, where it impinges on the first scanning mirror at a location coincident with the incident beam, to produce a scanning reference beam;

a grating having a series of alternating transparent and opaque regions and positioned to receive the scanning reference beam and product a pulsed reference beam indicative of the scan rate;

a reference beam detector for detecting the intensity of the reference beam and for generating a corresponding clock signal representative of the scan rate of the scanning reference beam and thereby the incident beam, wherein the clock signal is used by the means for sampling the first and second signals; and a lens located between the grating and the reference beam detector, for directing the pulsed reference beam to substantially the same position on the detector regardless of its point of impingement on the grating.

16. A confocal microscope as defined in claim 10, wherein said beam deflection means includes:

a first scanning mirror, rotatable about a first axis, for scanning the incident beam repeatedly across the sample at a first frequency, said first scanning mirror having a reflective surface arranged at a position that is substantially optically conjugate with a pupil of said microscope objective; and a second scanning mirror, disposed immediately adjacent to said first scanning mirror and rotatable about a second axis, substantially orthogonal to said first axis, for scanning said incident beam repeatedly across the sample at a second frequency, lower than said first frequency, and having a reflective surface opposed to the reflective surface or said first scanning mirror.

17. A confocal microscope as defined in claim 16, and further including:

means for separating a portion of the incident beam into a reference beam from an optical path between said laser and said first scanning mirror and for directing the reference beam toward said first scanning mirror, where it impinges on the first scanning mirror at a location coincident with said incident beam, to produce a scanning reference beam;

means for producing a sampling clock signal indicative of the scan rate from the scanning reference beam; and means for digitizing the signal generated from said detector in response to the sampling clock signal.

18. A confocal microscope as defined in claim 10, and further including a spatial filter disposed between said laser and said aperture means and having a pinhole through which said incident beam passes.

* * * * *